UNITED STATES PATENT OFFICE.

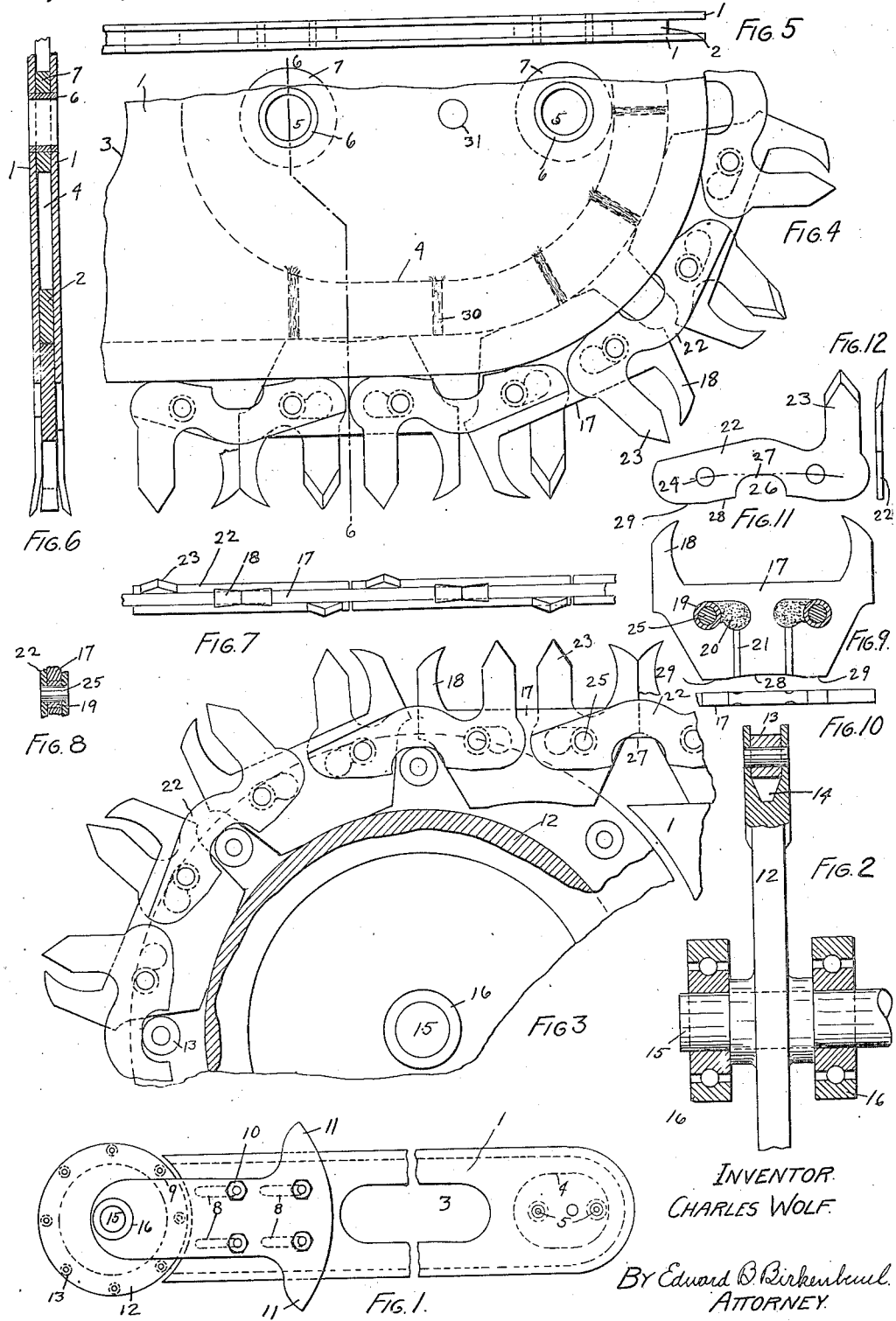

CHARLES WOLF, OF PORTLAND, OREGON.

LINK SAW.

1,397,026.   Specification of Letters Patent.   Patented Nov. 15, 1921.

Application filed March 10, 1920. Serial No. 364,694.

*To all whom it may concern:*

Be it hereby known that I, CHARLES WOLF, a citizen of the United States, and a resident of Portland, in the county of Multnomah and State of Oregon, have invented a new and useful Link Saw, of which the following is a specification.

This invention relates more particularly to a saw for felling and cutting up large trees and timbers, although it is by no means limited to this class of operations.

The object of my invention is to reduce the time consumption and man power required in timber operations.

I accomplish these results in the manner set forth in the specifications following and illustrated in the accompanying drawing, in which:—

Figure 1 is an elevation of the saw frame, its driving sprocket and adjusting bracket; Fig. 2 is a sectional detail through the driving sprocket; Fig. 3 is an enlarged detail of the sprocket end of the assembled saw partly in section; Fig. 4 is an enlarged detail of the tip of said saw; Fig. 5 is a plan of the tip of the saw frame with the teeth removed; Fig. 6 is a broken section along the line 6—6 in Fig. 5; Fig. 7 is a bottom view of Fig. 4 showing the assembled teeth; Fig. 8 is a sectional detail through one of the link rivets; Fig. 9 is an elevation of a detail of a drag link; Fig. 10 is a bottom view of Fig. 9; Fig. 11 is an elevation of one of the knife links of which Fig. 12 is an end elevation.

Similar numbers of reference refer to the same or similar parts throughout the several views.

Referring in detail to the drawing, the numeral 1 indicates the outside portion of the saw frame of which 2 is the central portion. These parts are secured together in the most convenient manner, preferably by spot welding. An opening 3 is cut away in the center of the frame for lightening purposes and also for handling. An oil reservoir 4 is formed in the tip end of the saw frame and the two finger holes 5 are formed out of bushings 6 which pass through the saw frame, and have on them between the two outer frames 1 the collars 7 which act as spacers. The slots 8 in the saw frame are used to form an adjustable connection with the bracket 9 to which it is clamped by means of the bolts 10. Stops 11 are formed on the bracket 9, and the driving sprocket 12 with its roller teeth 13 is also mounted on the bracket 9. A wedge shaped groove 14, whose narrowest portion is slightly greater than the width of the drag teeth as shown in Fig. 10, is formed in the circumference of said sprocket wheel. A drive shaft 15 with its bearing 16 serve to support the sprocket 12 of the bracket 9. Any suitable means may be used to drive the shaft 15, although, of course, it will be understood that this saw is primarily a portable one and is liable to be used in any position, and the driving mechanism must therefore lend itself to these requirements, which qualities are found in driving mechanism common in the art.

In the grooved track formed between the outer portions 1 of the saw frame and in the groove 14 is placed a specially constructed chain having a rather thick central portion 17, which has a drag tooth 18 formed on each end and is supplied with the elongated holes which contain the small bushing 19 and the oiling felt 20. The grooves 21 convey oil by centrifugal force from the central oil reservoir 4 to the oiling felt 20. The drag links 17 are united by pairs of cutting links 22 which have their cutting teeth 23 on one end only. Each pair of links is mounted with their teeth at opposite ends of the link which they form.

The holes 24 in the links 22 may be of slightly smaller diameter than the interior hole of the bushing 19 which permits the pins 25 to be pressed into place. It will be evident that if the pin 25 is a press fit in the hole 24 and a working fit in the hole of the bushing 19, it renders it unnecessary to remove both pins in each link in order to remove one link, as would be the case if the shoulder were formed on the pin itself. It will also be understood that the bushings 19 are hardened and the pins 25 are comparatively soft, for obvious reasons.

A recess 26 is formed in the cutting links 22 whose edge 27 lies in an arc which passes through the holes 24 from the rotating center of the sprocket 12. This edge 27 should preferably lie on the outside of the arc thus formed, for reasons which will be explained later.

A second arc from the same center 12 forms a curve 28 on the under side of the links 17 and 22 so that they will conform with the bottom of the groove 14 and the corresponding groove at the tip of the saw frame. A portion 29 of the links 17 and 22 remains flat or parallel to the chord of the arc just mentioned, and it is upon these faces that the links ride in the straightaway course of their travel around the saw frame.

Oil wicks 30 formed in the portion 2 of the frame convey the oil from the central reservoir 4 to the groove in which the links operate. A filling hole 31, which is suitably plugged, serves to admit oil to the reservoir 4.

By examination of the drawing it will be seen that the links pass around the frame. The ends of the raker teeth are practically touching each other when the links are in the straight-away portion of their travel. This is the place where the saw does its cutting and it is very important that the individual teeth be held in perfect alinement during this time and prevented from canting, which would seriously effect the groove in which they operate and increase the amount of saw kerf.

In passing over the sprocket and rounded end of the saw frame the tendency of the links is to pull themselves out of alinement, as they are pulling downward in an exaggerated degree.

By referring to Fig. 11 it will be seen that an arc which has been struck from the center of the curve about which the links must rotate, will pass through both of the pins 25 in the links 22, as well as through the edge 27 in the same members. It will be plainly seen that any pull which is exerted on the pins 25 from the under side of the above mentioned arc will tend to hold the links in the plane of the pull, because the sprocket supporting same comes in contact with the link on or above this arc. In the meanwhile, the curved faces 28 of the links 22 ride on the curved end of the saw frame. During the straightaway travel of the links, the straight face 29 rides on the lateral face of the saw frame 1. The lower curved face 28 of the drag links 17, rest on the bottom of the groove 14 when passing over the sprocket 12 or on the central portion 2 of the saw frame. The straight portion 29 on the link 17 which is similar to the same numbered part on link 22, also forms a sliding base for its part on the straightaway travel.

It is evident that with the ordinary construction of chains, the length of the individual links is almost made prohibitive, owing to the fact that resistance on the points of the teeth 18 or 23 tends to make the chain buckle at that point; whereas in my construction, any tendency to draw a tooth away from its base at either end, is counterbalanced by a corresponding effect from the adjacent tooth exerting a similar force in the opposite direction. The teeth therefore act in opposition to each other and offset the buckling tendency common with saws of this type. This renders it possible to use a chain of comparatively short links and a correspondingly smaller sprocket.

It will be noticed that the groove 14 of the sprocket 12 is slightly tapered, leaving its lowermost edge only slightly wider than the thickness of the raker link 17 at the edge 29. This slight play, permits any side strain to be taken up by the face of the saw frame itself without damaging the groove of the frame or the sprocket, or unnecessarily increasing the amount of friction.

Still another feature of my device exists in the fact that it is not necessary to carry an extreme tension on the chain, as is usually done, with the resulting wear on the parts. It is only needed to keep the slack out of the chain by means of adjusting bracket 9. The stops 11 formed on this bracket are adapted to rest against the work.

While it has been suggested that the hole in the bushing 19 may be slightly larger than are holes 24, it is more desirous to make them alike, and then by forcing the pin 25 into place, we have the effect of a double shouldered pin without the resulting difficulty of assembling or disassembling, with the additional advantages of the various degrees of hardness which may be used in the including parts.

It will be observed that I have constructed my saw to ride on the tops and bottom of its groove. The outer and upper surfaces giving stability to the saw and the inner and lower portion of the groove providing a guide and a means for preventing the uneven wearing of the sides and the subsequent spreading action by the drag teeth in the groove.

It is apparent that with this construction it is possible to reverse the motion of the saw and thereby add to its life and its capacity for work. This saw need not be lifted out of its cut, but may be withdrawn as may be any hand saw which does not have a handle on its tip.

The fact that I have greatly reduced the pitch of the chain without reducing the base line from which the teeth operate renders a desirable cutting speed a safe one for this saw, and the further fact that the chain need not be kept in extreme tension also lends itself to a minimizing of strain, friction and wear on the working parts and their guides.

While I have thus illustrated and described my invention, it is not my desire to limit myself to this precise construction or method of application of the device but intend that it shall cover all forms and modifications that fall fairly within the appended claims,

What I claim is new and desire to protect by Letters Patent of the United States is:—

1. A block chain saw having a drag tooth on each end of each block link and having one cutter tooth positioned at each end of each pair of connecting links between pairs of drag teeth and connecting pins passing through said block and connecting links between the drag and cutting teeth in a manner that the points of both the cutting and the drag teeth come between the adjacent pivot of the link to the block and the end of the link and the block respectively.

2. A chain saw consisting of a block chain, the combination of a series of block links each of which has a pair of facing drag teeth formed thereon at its extreme ends and pairs of connecting links joining said block links, each connecting link of each pair having a cutting tooth formed at one end beyond its union to a block link and on the end opposite to the cutting tooth of its mate, and connecting pins passing through said block and connecting links between each adjacent cutting and drag link.

3. An oiling device for link saws, consisting of an oil reservoir in the saw frame, wicks leading from said reservoir to the sliding surfaces of the saw, grooves formed in the sliding parts of the chain links and leading from said sliding surfaces to the pins in said links by way of a felt washer containing recess adjoining the link pin pockets.

4. A drag link for link saws, consisting of a flat link member having a drag tooth formed at each end, two pinholes formed along the length of said link, said link having a flat base parallel to the points of said drag teeth, and having the central portion of said base line shaped to conform with the curves upon which it may ride.

5. A cutting link for link saws, consisting of a link having a cutting tooth formed at one end, two pinholes formed along its length, and a sprocket engaging recess formed on the side opposite the tooth and between said pinholes, said recess extending to the arc which passes through both pinholes, said arc having the same center as does the smallest curve about which said link must travel, and having a flat sliding base which is slightly curved near its center to conform with the curves upon which it may ride.

6. In a reversible link saw, the combination of an endless block chain having a drag tooth formed on each end of each block link and facing the link center, pairs of connecting links having one cutting tooth at each opposite end and side and having a sprocket-engaging recess formed on the under side, a grooved frame adapted to carry said chain, and a driving sprocket mounted on said frame adapted to engage said chain.

7. In an oiling device for link saws, the combination of a grooved frame having an oil reservoir and channels within said frame leading from said reservoir to the bottom of said groove, and wicks in said channels adapted to regulate the flow of oil through said channels.

CHARLES WOLF.